(12) United States Patent
Maestrini

(10) Patent No.: US 7,207,163 B2
(45) Date of Patent: Apr. 24, 2007

(54) SIZE-ADJUSTABLE SHOE FOR HOOFED ANIMALS

(76) Inventor: Manolo Maestrini, Wildenwis, CH-8335, Hittnau (CH)

( * ) Notice: Subject to any disclaimer, the term of this patent is extended or adjusted under 35 U.S.C. 154(b) by 91 days.

(21) Appl. No.: 10/536,757

(22) PCT Filed: Nov. 27, 2003

(86) PCT No.: PCT/CH03/00752

§ 371 (c)(1),
(2), (4) Date: May 25, 2005

(87) PCT Pub. No.: WO2004/047526

PCT Pub. Date: Jun. 10, 2004

(65) Prior Publication Data

US 2006/0162296 A1    Jul. 27, 2006

(30) Foreign Application Priority Data

Nov. 27, 2002    (CH) .................................. 2003/02

(51) Int. Cl.
*B68C 5/00* (2006.01)

(52) U.S. Cl. .................................................. 54/82

(58) Field of Classification Search ................. 54/82; 168/1, 2, 18; 119/850

See application file for complete search history.

(56) References Cited

U.S. PATENT DOCUMENTS

| 719,687 | A | * | 2/1903 | Nickerson ................ 168/2 |
| 830,403 | A | * | 9/1906 | Barclat .................... 54/82 |
| 3,732,929 | A | * | 5/1973 | Glass ...................... 54/82 |
| 3,794,119 | A | * | 2/1974 | Paiso et al. .............. 168/18 |
| 4,736,800 | A | * | 4/1988 | Rohner ................... 54/82 |
| 4,744,422 | A | * | 5/1988 | Dallmer .................. 54/82 |
| 5,224,549 | A | * | 7/1993 | Lightner ................. 54/82 |
| 6,305,328 | B1 | * | 10/2001 | Marquis ................ 119/850 |

* cited by examiner

*Primary Examiner*—Thomas Price
(74) *Attorney, Agent, or Firm*—Robert L. Epstein; Epstein Drangel Bazerman & James, LLP

(57) ABSTRACT

The present invention relates to a size-adjustable shoe for hoofed animals consisting of at least one protecting portion and a fixing portion wherein the protecting portion comprises at least one sole, a cap extending to the front and to both sides and a fixing device, and the fixing portion comprises at least one heel portion, two side tabs and a fixing device. The heel portion can be attached to the sole with an adjustable spacing, and the fixing devices enable a firm hold of the hoofshoe to the hoof.

12 Claims, 3 Drawing Sheets

SIZE-ADJUSTABLE SHOE FOR HOOFED ANIMALS

Figure 1:
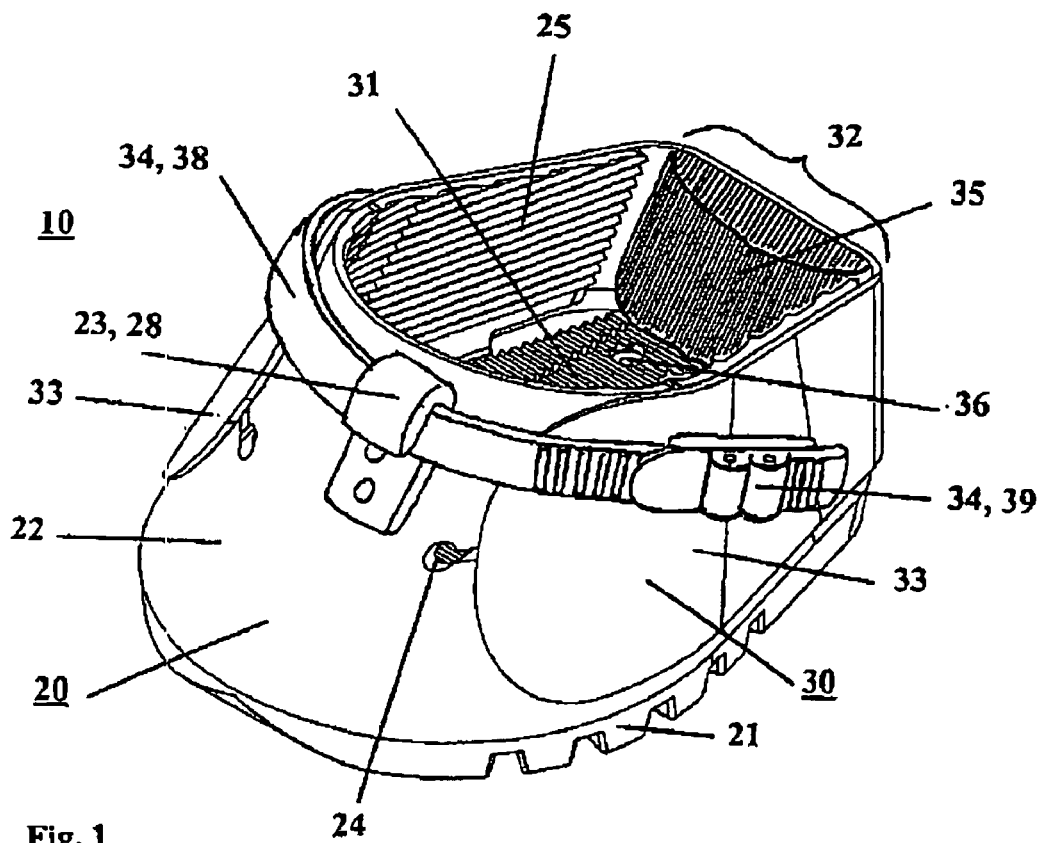

The present invention relates to a size-adjustable shoe for hoofed animals (ungulates).

Since a long time many species of hoofed animals have been domesticated and are used as domestic animals or for sports purposes. These hoofed animals include all races of horses, ponies, donkeys, and mules among others. Originally, these animals ran over a natural ground, and therefore their hoofs were more or less abraded to the same extent to which they grew. In contrast, however, the hoofs of domesticated hoofed animals are subject to more abrasion on the often loose, unconsolidated ground on which they also carry loads.

In order to prevent this abrasion of the hoofs hoofed animals have been shoed with horseshoes since a long time. For this purpose, a qualified farrier or hoof carer fits horseshoes of a suitable size to the hoofs and attaches them with hoof nails. After six to eight weeks these horseshoes are replaced, on the one hand because they are worn off and on the other hand because the hoofs have grown in the meantime and have to be trimmed.

Horseshoes show various disadvantages. They are very slippery depending on the surface conditions. In cold weather, the strong sticking of snow and ice to the metallic horseshoes becomes a problem. During the winter, cleats to the horseshoes provide for a better grip to the ground.

For this reason, hoofshoes have been developed primarily for horses and horse-like animals. They are fitted to each hoof individually by farriers or hoof carers. Such shoes are fastened to the hoofs prior to riding and are removed afterwards. They consist mostly of plastic, textiles and/or leather and have a horseshoe-like profile on the sole to assure a good grip for the animal. Although the shoes are manufactured in various sizes, the hoof carer has to fit each shoe with respect to width, length and steepness by using a hot air hair dryer. After about six months the soles are worn down, and the shoes have to be replaced.

A hoofshoe is presented in U.S. Pat. No. 4,744,422 which is open at its bottom side where it exhibits the shape of a horseshoe. An complex buckling mechanism with a padded ball portion provides support. It is necessary, however, to check the fit regularly because otherwise there is a risk of injury.

EP 0212445 describes a hoof garment wherein the attachment is performed in the region of the ankles and not in the region of the hoof as it is usually the case. Sites of chafing form after a long run.

CH 680181 describes another foot wear for hoofed animals having a rear fastening strap of the type of a heel strap which can lead to sites of chafing. A hammer is used to put it on while a hoof pick is said to be useful for its removal.

U.S. Pat. No. 3,732,929 and US 5,661,958 present hoofshoes which are provided with a ski shoe buckle for tightening a strap on the front cap thereof which has an adjustable heel strap. Due to its compact shape also this shoe must be put on by means of a hammer and its later removal is very difficult.

U.S. Pat. No. 5,715,661 describes a hoofshoe having a fold-like heel portion to ensure an easier access. A nylon strap at the upper edge provides for hold. Due to its closed shape it can be used primarily as an orthopaedic shoe. On the other hand it can be hardly fit to different hoof shapes.

In WO 0016614 a multilayered shoe for hoofed animals is presented. Although a complicated assembly technique provides for good hold, an assembly belt extends over the skin of the animal and thus can result in sites of chafing upon slight slewing motions during running. In addition, three measurements have to be taken from the hoof to determine the appropriate size of the shoe. Cleaning of the commercially available version made of leather is very difficult.

A shoe for hoofed animals is presented in EP 1008295 wherein an inner element is deformable by pressure. However, a high pressure onto the ball can be very painful for the horse. Therefore the pressure adjustment is very critical. The front portion of the shoe can be opened.

All the models described herein have different shortcomings which have been explained above.

A common problem is the size of the shoes and the rather complicated fitting thereof. The more different sizes are fabricated the easier is the fitting but also the more expensive is the fabrication and the larger must be the storeroom of the vendor so that he always can offer a fitting model. Additionally it has to be taken into consideration that hoofs grow constantly and thus will soon fit no longer into the well-fitted shoe.

For the reason of the problems described herein of the known shoes for hoofed animals the present invention has the object of describing a shoe for hoofed animals which can be put on and off conveniently, provides for a good hold, can be easily cleaned, does not cause sites of chafing on the animal, is built in a cost-effective and simple manner, and is at least partially size-adjustable.

The object has been achieved by the features of claim 1.

In the following, the present invention will be described with respect to the drawings. The Figures show FIG. 1 a schematic representation of a model of a hoofshoe for hoofed animals according to the invention FIG. 2 two different perspective views-and a back-view of-a protecting-portion FIG. 3 a perspective view of a fixing portion FIG. 4 the view from the bottom of a possible embodiment of a profile FIG. 1 shows an example of a completely closed hoof shoe 10 as it is employed during use. In this arrangement it is similar to a shoe according to the state of the art.

Figure 2A:
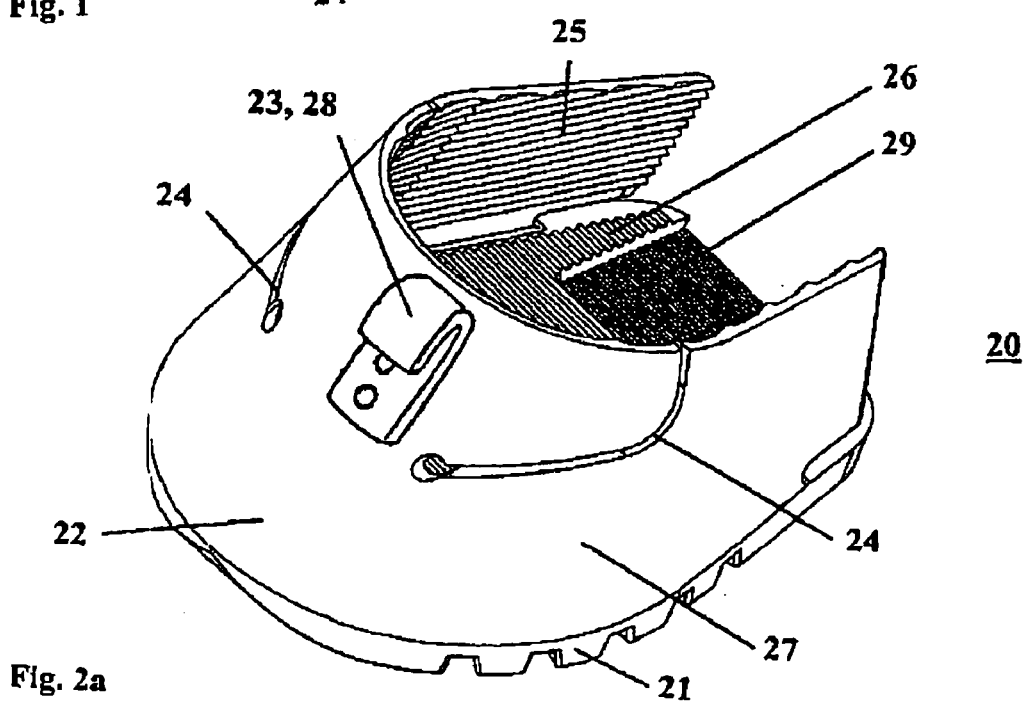
Figure 2B:
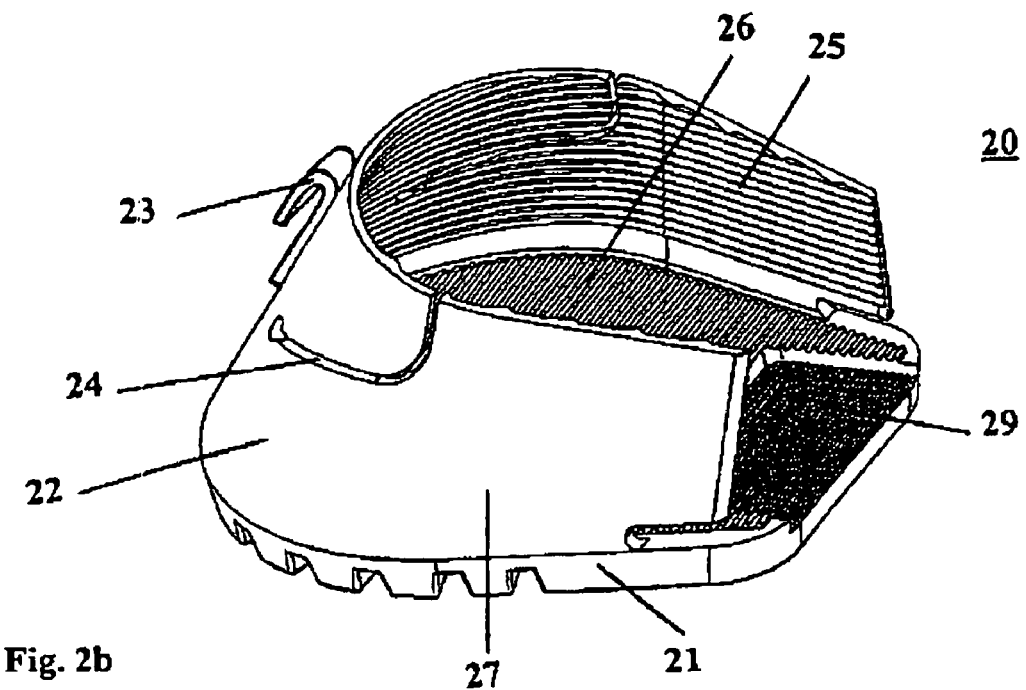
Figure 2C:
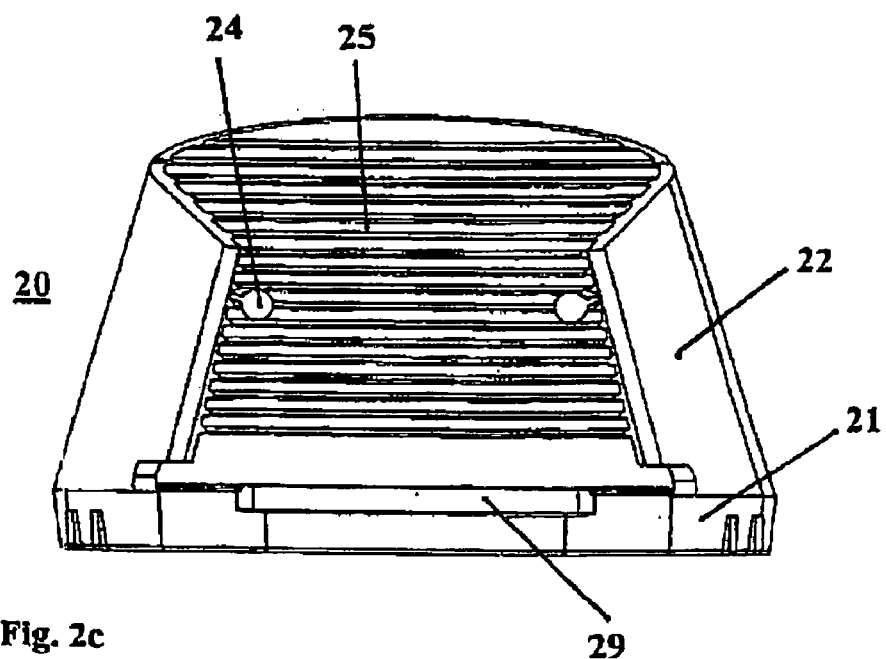
Figure 3:
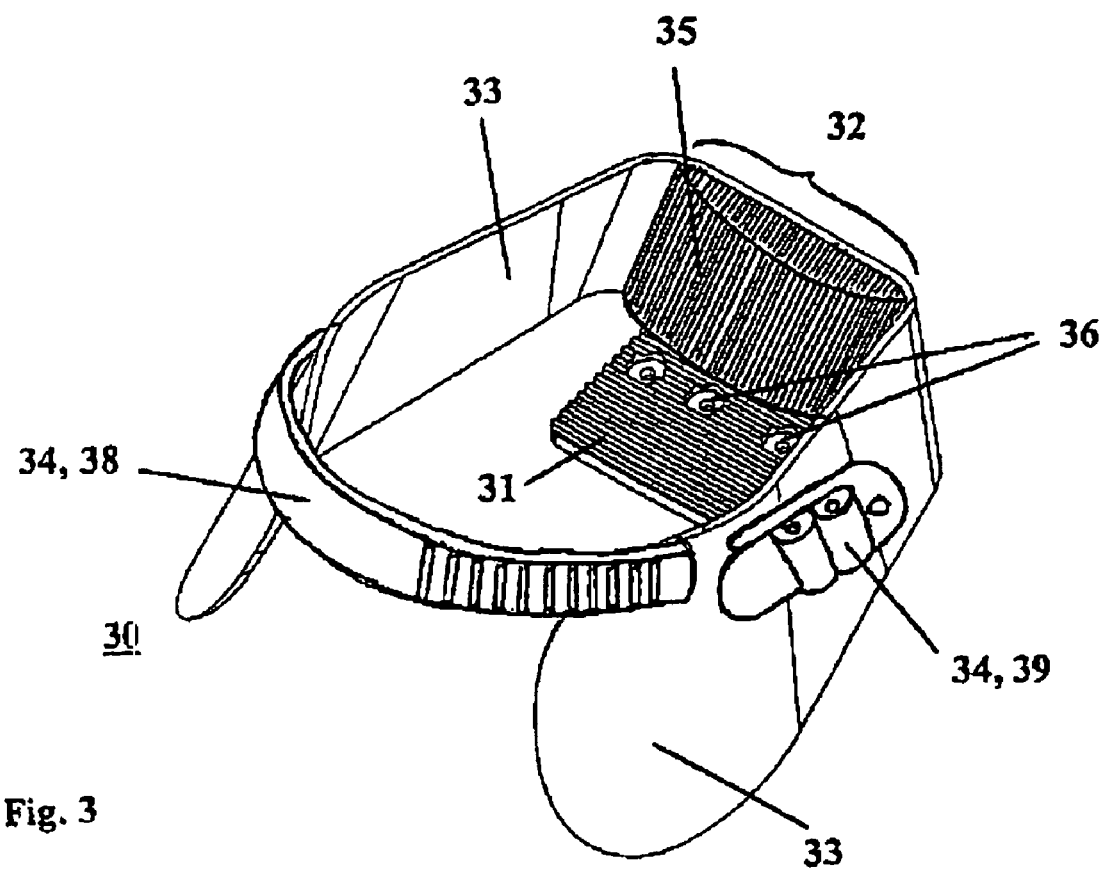

It can be seen from FIGS. 2 and 3 that the hoofshoe 10 consists of at least two portions which are be completely detachable from each other, i.e. of a protecting portion 20 according to FIG. 2 and a fixing portion 30 according to FIG. 3. These portions, appropriately placed one into the other, result in an embodiment 10 according to FIG. 1.

The protecting portion 20, essentially consisting of a sole 21, a cap 22, and a fixing device 23, represents the wear part which must be replaced after it is worn down. The fixing portion 30, consisting of an insole 31, a heel portion 32, two side tabs 33 and a fixing device 34, is individually adjusted in length to the hoof and can be attached to any other exchanged protecting portion 20. Accordingly, after the hoofshoe 10 has been worn down, first, only the protecting portion 20 has to be replaced and, second, no new length fitting has to be performed. On the one hand this lowers the usage costs and on the other hand lowers the costs and efforts required for fitting.

Figure 4:
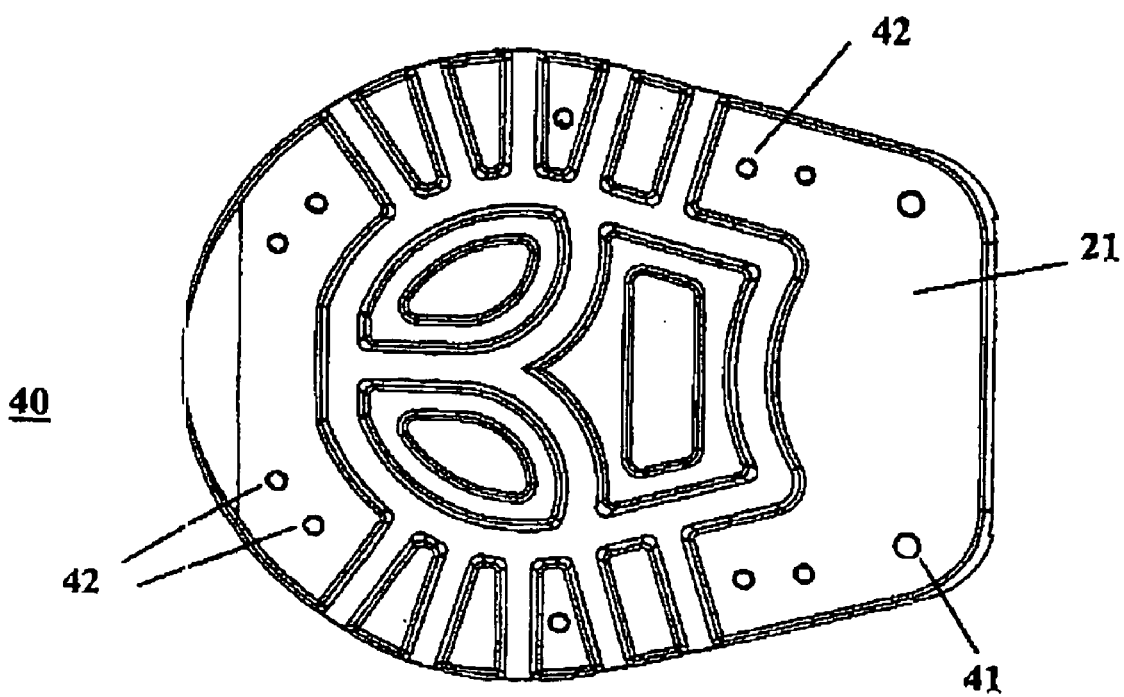

On its bottom surface the sole 21 of the protecting portion 20 in FIG. 2 can also have different profiles which can be selected according to the surface conditions, time of the year, and riding style. A possibility for a preferred profile 40 is shown in FIG. 4. Specifically, threads 41 can be for example added for the installation of cleats and/or means 42 can be provided for the installation of metal pins such as spikes. Preferably, so-called spikes are cast into the sole during the manufacturing process. In order to keep abrasion at a minimum, the sole 21 is preferably made from a strong material, preferably a hard plastic, for example polyurethane PU having an abrasion resistance with a Shore hardness of 80–100 A. Soles can be manufactured according to need for individual fields of application such as for example for summer (without spikes) or winter requirements or for jumping.

Similar to conventional shoes for hoofed animals, the cap 22 can be made of a softer material than the sole, for example also of plastic such as for example PU. The wall thickness of the cap 22, however, is smaller than that of the sole 21 and is between about 1 and 6 mm, preferably between 3 and 5 mm. Preferably, the cap 22 has one or more different, straight or shaped notches 24 with or without recesses enabling a fitted shape of the cap 22 to hoof shapes of variable steepness. The fixing device 23 at the cap 22 should be formed in such a way that it enables together with the fixing device 34 of the fixing portion 30 a good fixation of these two portions 20, 30.

The cap 22 is provided to ensure a good hold of the hoof to the sole 21. The lateral portion of the cap 22 is the so-called stabilizer 27. It is the purpose of the stabilizer 27 not to let the hoof slip off the sole 21 and to provide for good stabilisation of the hoof within the hoofshoe 10.

In order to improve the adherence of cap 22 to the hoof, a structure 25 can be at least partially formed in or attached to the inner surface of the cap 22 and especially on its front portion and at both sides, for example in the form of a rubber coating. This structure 25 has for example the form of grooves or nubs. Another advantage of this structure 25 is that it promotes air flow around the hoof.

On the inner surface of the sole 21 there can also be at least partially formed or attached a structure 26, for example in the form of grooves, serration or nubs, to promote air flow. A structure of this type prevents slipping or twisting of the hoof within the hoofshoe.

The protecting portion 20 is open at its rear end so that longer hoofs do not collide with the rear end.

The heel portion 32 itself is made of a strong material, preferably a strong plastic having a wall thickness of between 3 and 7 mm. At its inner surface facing the hoof a padding 35 of a soft material may be installed, for example of a soft plastic or a neoprene to ensure convenient and good hold to the rear portion of the hoof, the ball portion, and to prevent injuries. The side tabs 33 are on the other hand made from a similar material as the cap 22, and in the functional state can be placed plain around the cap 22. The fixing device 34 is formed in a manner that it connects the two side tabs to the fixing device 23 at the cap 22 and thus ensures a firm hold around the hoof.

The insole 31 is preferably articulated with the lower edge of the heel portion 32 and consists of a flexible, strong material, for example PU or a rubber mat or an equivalent material having a thickness of between 1 and 7 mm, preferably between 3 and 5 mm. The insole 32 can be preferably cast in one piece together with the heel portion 32 from the same material.

For the assembly of the fixing portion 30 and the protecting portion 20, the insole 31 is placed onto a preferably essentially rectangular recess 29 on the sole 21 of the protecting portion 20 and is fixed thereon in a length-adjustable manner. The fixation 36 can be carried out by means of one or more, preferably by means of four screws. The insole 31 originally is of a length sufficient to adapt the hoofshoe 10 also to long hoofs. Studies have shown that in most of the cases it is sufficient to adjust the length once.

Thus, after the insole 31 has been placed into the protecting portion 20, the length of the hoofshoe 10 can be determined by inserting the insole 31 more or less into the protecting portion 20. For smaller hoofs the insole 31 can be shortened in length so that it can be fitted completely into the recess 29.

In this way the hoofshoe 10 can be adjusted in length and can be fitted to each individual hoof in a simple manner.

The screw fitting 36 can be performed directly through the insole 31 into the sole 21 in the area of the recess 29. The recess 29 can be provided with a strong plate, for example a metal plate. A plate of this type, for example one made of a hard aluminum, can be cast in during the manufacturing process. This provides for a better grip for the screws and an improved stability of the connection between the protecting portion 10 and the fixing portion 20. Alternatively or additionally, threads can be inserted in the sole, for example metal threads.

Preferably, the insole 31 has on its bottom surface a structure (not shown in the drawings) which together with a corresponding structure of the upper surface of the recess 29 essentially prevents displacement.

By the flexible connection of the insole 31 to the heel portion 32 and by the notches 24 with or without recesses in the cap 22 the hoofshoe can be easily opened ensuring a simple access for the hoof to the hoofshoe 10. Due to the notches 24 the cap 22 accommodates the steepness of the hoof shape. By using the fixing devices 23, 34 the shoe can be easily and firmly closed. For removal the steps are carried out in the opposite order so that the removal is as simple as the application.

In the embodiment shown in FIGS. 1 and 2, the fixing device 23, 34 essentially comprises a strap 38 which similar to ski shoes, snowboard shoes, roller blades or inline skates can be connected to a buckle 39 which is for example provided with a snap-in locking device for easy retightening. Eyes, loops or hooks 28 at the cap 22 ensure hold of the strap 38 at the protecting portion 20.

The hoofshoe 10 can be easily cleaned by means of water and a brush.

The padding 35 prevents stones and other particles from getting into the hoofshoe 10 during running of the hoofed animal where they would cause bruises, injuries an pain in the ball portion of the hoofed animal.

In the rear portion of the stabilizer 27 a fixed insole of a desired thickness can be additionally installed if the hoof is narrower than the shoe. This improves the hold. Appropriate insoles of variable thickness and with suitable attachment means, for example with an adhesive device, can be used during the size-adjustment to a hoof.

There are numerous alternative attachment means between the protecting portion 20 and the fixing portion 30 which are adjustable in length and detachable. Thus, the insole 31 can also be passed under a clip which is attached to the protecting portion 20 and can afterwards be adjustably and preferably detachably connected to the heel portion 32 for attachment.

The advantage of the present invention is the length adjustability of the hoofshoe 10 and the easy fitting thereof as well as in the good adjustment of the fit to the hoof shape and the easy application and removal. Another advantage is the quick, easy and firm attachment of the hoofshoe with good hold, the prevention of bruises, injuries and pain for example due to stones falling into the shoe and in the replaceability of each one of the portions 20, 30 after they are abraded.

LIST OF NAMES 10 hoofshoe
20 protecting portion
21 sole
22 cap
23 fixing device
24 notches
25 structure on the cap
26 structure on the sole
27 stabilizer
28 eyes or hooks
29 recess
30 fixing portion
31 insole
32 heel portion
33 side tabs
34 fixing device
36 fixing for example by means of screws
38 strap
39 buckle
40 profile
41 thread
42 metal pins or means therefore

The invention claimed is:

1. A size adjustable hoofshoe (10) for hoofed animals consisting of at least one protecting portion (20) and a fixing portion (30) characterized in that the protecting portion (20) comprises at least one sole (21) fully covering the hoof from the bottom side, a cap (22) extending to the front and both sides, and a fixing device (23) and in that the fixing portion (30) comprises at least an insole (31), one heel portion (32), two side tabs (33) and a fixing device (34) wherein the heel portion (32) can be attached to the sole (21) by the insole (31) in a length-adjustable manner and wherein the fixing devices (23, 34) enable a firm hold of the hoofshoe (10) to the hoof.

2. A hoofshoe according to claim 1 characterized in that the fixing portion (30) is completely detachable from the protecting portion (20).

3. A hoofshoe according to claim 1 characterized in that on the inner surface of the heel portion (32) a padding (35) for the protection of the ball portion of the hoofed animal is attached.

4. A hoofshoe according to claim 1 characterized in that the cap (22) is provided with one or more notches (24) with or without recesses which are arranged to enable the cap (22) to accommodate hoofs of variable steepness.

5. A hoofshoe according to claim 1 characterized in that the sole (21) is provided with a profile (40) which preferably is non-slipping.

6. A hoofshoe according to claim 1 characterized in that the sole (21) has a thread (41) for cleats and/or means for metal pins (42).

7. A hoofshoe according to claim 1 characterized in that the sole (21) has metal pins (42).

8. A hoofshoe (10) for hoofed animals consisting of at least one protecting portion (20) and a fixing portion (30) characterized in that the protecting portion (20) comprises at least one sole (21), a cap (22) extending to the front and both sides, and a fixing device (23) and in that the fixing portion (30) comprises at least one heel portion (32), two side tabs (33) and a fixing device (34) wherein the heel portion (32) can be attached to the sole (21) with an adjustable spacing and wherein the fixing devices (23, 34) enable a firm hold of the hoofshoe (10) to the hoof, characterized in that on the inner surface of the cap (22) there is at least partially formed or attached a structure (25) which is preferably non-slipping with respect to a hoof.

9. A hoofshoe (10) for hoofed animals consisting of at least one protecting portion (20) and a fixing portion (30) characterized in that the protecting portion (20) comprises at least one sole (21), a cap (22) extending to the front and both sides, and a fixing device (23) and in that the fixing portion (30) comprises at least one heel portion (32), two side tabs (33) and a fixing device (34) wherein the heel portion (32) can be attached to the sole (21) with an adjustable spacing and wherein the fixing devices (23, 34) enable a firm hold of the hoofshoe (10) to the hoof, characterized in that an insole (31) is attached to the fixing device (34) and that at the lower surface of the insole (31) as well as the sole (21) at its upper surface are provided at least partially with structures which are non-slipping with respect to each other.

10. A hoofshoe according to claim 9 characterized in that the upper surface of the sole (21) has a preferably essentially rectangular recess (29) into which the insole (31) can be inserted with an adjustable length.

11. A hoofshoe according to claim 9 characterized in that the insole (31) can be attached adjustably to the sole (21) by means of screws.

12. A hoofshoe according to claim 1 characterized in that the fixing devices (23, 34) comprise straps (38), buckles (39) and eyes, loops and/or hooks (28).

* * * * *